US011109124B1

United States Patent
Stoner et al.

(10) Patent No.: US 11,109,124 B1
(45) Date of Patent: Aug. 31, 2021

(54) SYSTEM FOR SIGNAL MANAGEMENT

(71) Applicants: David Stoner, Decatur, AL (US); Chrissy Kay Cleveland, Decatur, AL (US); Jeffrey Machamer, Huntsville, AL (US); Thomas A Siniard, Decatur, AL (US); Joseph Robichaud, Chattanooga, TN (US)

(72) Inventors: David Stoner, Decatur, AL (US); Chrissy Kay Cleveland, Decatur, AL (US); Jeffrey Machamer, Huntsville, AL (US); Thomas A Siniard, Decatur, AL (US); Joseph Robichaud, Chattanooga, TN (US)

(73) Assignee: 3-GIS, Decatur, AL (US)

( * ) Notice: Subject to any disclaimer, the term of this patent is extended or adjusted under 35 U.S.C. 154(b) by 0 days.

(21) Appl. No.: 15/937,236

(22) Filed: Mar. 27, 2018

Related U.S. Application Data (62) Division of application No. 14/943,603, filed on Nov. 17, 2015, now Pat. No. 9,930,432.

(51) Int. Cl.
*H04Q 11/00* (2006.01)
*H04B 10/077* (2013.01)

(52) U.S. Cl.
CPC ..... *H04Q 11/0066* (2013.01); *H04B 10/0771* (2013.01); *H04Q 2011/0081* (2013.01)

(58) Field of Classification Search
CPC ........ H04Q 11/0066; H04Q 2011/0081; H04B 10/0771
USPC .......................................................... 398/13
See application file for complete search history.

(56) References Cited

U.S. PATENT DOCUMENTS

| | | | | |
|---|---|---|---|---|
| 6,058,262 A * | 5/2000 | Kawas | .................... | G06F 30/00 703/13 |
| 6,347,336 B1 * | 2/2002 | Song | ....................... | H04L 41/12 370/254 |
| 9,025,469 B2 * | 5/2015 | Bowler | .................... | H04L 41/12 370/242 |
| 2004/0015309 A1 * | 1/2004 | Swisher | .............. | H04L 41/0813 702/79 |
| 2006/0153496 A1 * | 7/2006 | Tanobe | ............... | H04J 14/0227 385/24 |
| 2008/0091507 A1 * | 4/2008 | Bankston | ............ | G06F 3/04842 705/7.13 |
| 2013/0004179 A1 * | 1/2013 | Nielsen | .................... | H04B 3/50 398/115 |
| 2014/0278273 A1 * | 9/2014 | Bowler | .................. | H04L 41/12 703/1 |
| 2015/0030328 A1 * | 1/2015 | Fukuda | ................... | G06F 13/00 398/58 |
| 2016/0352569 A1 * | 12/2016 | Galliher, III | ............ | H04L 29/06 |

* cited by examiner

*Primary Examiner* — Dalzid E Singh
(74) *Attorney, Agent, or Firm* — BabcockLegal Services (57) ABSTRACT

A method of maintaining functioning relationships between geospatial features and standalone tables for rendering, editing, and managing a geospatial representation of a complete signal path comprises:
  Creating a structure,
  Placing equipment that associates to the structure,
  Placing cable and connect to port on fiber equipment,
  Determining type of connection,
  Determining type of equipment connection, and
  Creating record of the signal path.

11 Claims, 13 Drawing Sheets

SYSTEM FOR SIGNAL MANAGEMENT

CROSS-REFERENCE TO RELATED APPLICATIONS

This application is a Divisional of U.S. application Ser. No. 14/943,603 filed Oct. 17, 2015.

STATEMENT REGARDING FEDERALLY SPONSORED RESEARCH

Not Applicable

FIELD OF THE INVENTION

This invention relates to a system that identifies and locates geospatial features of a signal path.

BACKGROUND OF THE INVENTION

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Telecom equipment and the signals sent can comprise a complicated collection of signals and devices. If there is a problem with a connection it is often a painstaking endeavor to locate the equipment and/or signal line that is not working or responding. In many instances personnel will need to physically investigate the signal path to determine any connectivity problem or painstakingly moving from one element to the next element between the source and end of a signal. It is highly desirable to be able to quickly determine the location, devices, and status along a signal path. Unique to this application, a signal path is a collection of geospatial features and table records representing a path the signal takes from source to end. There is a need for a system that can quickly provide information on the geospatial features along a signal path in a few records that can be linked by the particular signal ID of the signal.

The instant invention, with its multiple embodiments as disclosed within this application, provides a process and system that fills this need. The art referred to and/or described within this application is not intended to constitute an admission that any patent, publication or other information referred to herein is "prior art" with respect to this invention. In addition, this section should not be construed to mean that a thorough search has been made or that no other pertinent information as defined in 37 C.F.R. § 1.56(a) exists.

All US patents and applications and all other published documents mentioned anywhere in this application are incorporated herein by reference in their entirety.

Without limiting the scope of the invention, a brief summary of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided as well, only for the purposes of complying with 37 C.F.R. 1.72. The abstract is not intended to be used for interpreting the scope of the claims.

BRIEF SUMMARY OF THE INVENTION

In at least one embodiment of the invention, a method for managing the connectivity between two or more telecom equipments is taught. The method can comprise:

Creating a signal path. The signal path is a collection of geospatial features designed to carry a signal between a source and an end;

Entering the geospatial features in a record that can be edited and managed to represent the complete signal path; and Referencing the signal to each geospatial feature and record on the signal path of the signal.

In some embodiments, the method further comprises creating a map of the features of the record associated with the signal path.

In some embodiments, the record is presented as an editable table.

In some embodiments, the geospatial features comprise one or more structures, one or more equipment, one or more ports, one or more cables, and one or more fibers.

In some embodiments, each geospatial feature and record relating to the signal has a reference to a signal IPID attribute.

In some embodiments, the record has a primary key that is the signal IPID attribute.

In some embodiments, the signal path record includes data on individual fibers within a cable.

In some embodiments, when trouble shooting a network, a light pulse can be sent that will reflect obstructions in the network (e.g breaks in cables). The signal record allows for calculating the distance and taking that calculated distance in order to indicate the possible fault location.

In some embodiments, a signal can be sent that is bounced back and the location of an error in the signal path can be determined.

In some embodiments, signal paths can be analyzed from multiple locations and the geospatial features common to all the signal paths are identified as possible fault locations.

In some embodiments, the geospatial features of a signal path can be displayed as multiple standalone tables in a single screen view.

In some embodiments, a method of maintaining functioning relationships between geospatial features and standalone tables for rendering, editing, and managing a geospatial representation of a complete signal path is taught that comprises:

Creating a structure,

Placing equipment that associates to the structure,

Placing cable and connect to port on fiber equipment,

Determining type of connection,

Determining type of equipment connection, and

Creating record of the signal path.

In some embodiments, the method includes creating a map of the features of the record associated with the signal path.

In some embodiments, the geospatial features of a signal path can be displayed as multiple standalone tables in a single screen shot.

These and other embodiments which characterize the invention are pointed out with particularity in the claims annexed hereto and forming a part hereof. However, for further understanding of the invention, its advantages and objectives obtained by its use, reference should be made to the drawings which form a further part hereof and the accompanying descriptive matter, in which there is illustrated and described embodiments of the invention.

BRIEF DESCRIPTION OF THE SEVERAL VIEWS OF THE DRAWING(S)

A detailed description of the invention is hereafter described with specific reference being made to the drawing.

FIG. 5 is a collection of table records for the signal path of FIG. 1a.

DETAILED DESCRIPTION OF THE INVENTION

While this invention may be embodied in many different forms, there are described in detail herein specific preferred embodiments of the invention. This description is an exemplification of the principles of the invention and is not intended to limit the invention to the particular embodiments illustrated.

A signal path is a collection of geospatial features that can be tabulated in a table record to represent a path the signal takes from source to end.

Figure 1:
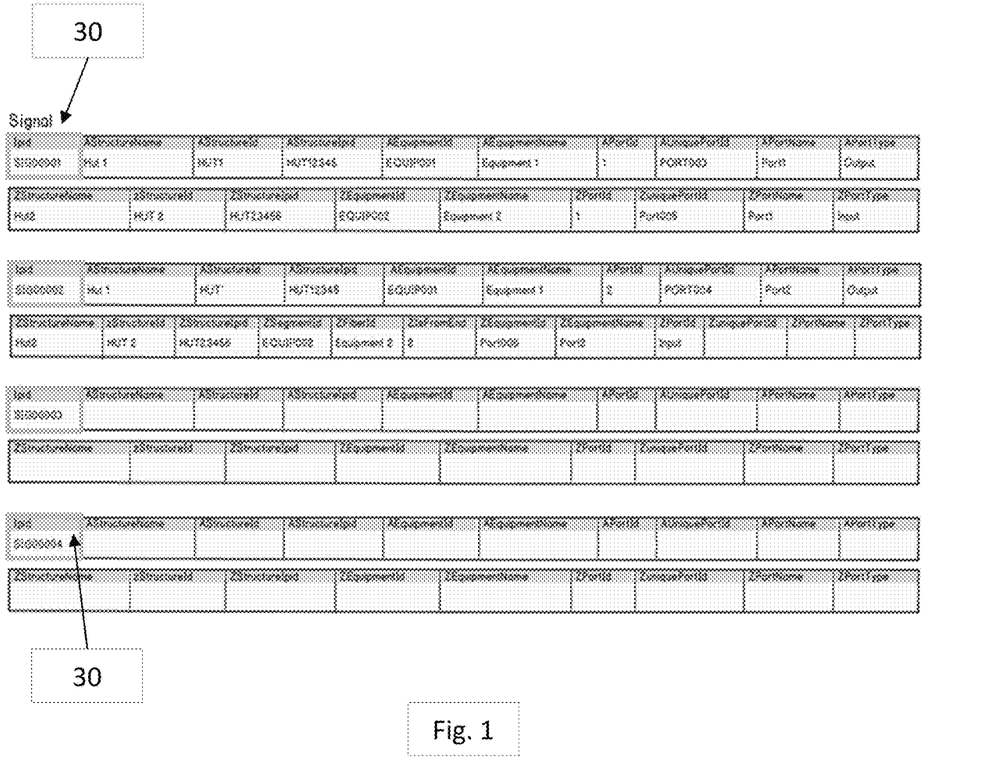
FIG. 1 is a signal table record in which Signals 1 and 2 are fully populated and Signals 3 and 4 are not.
Figure 1A:
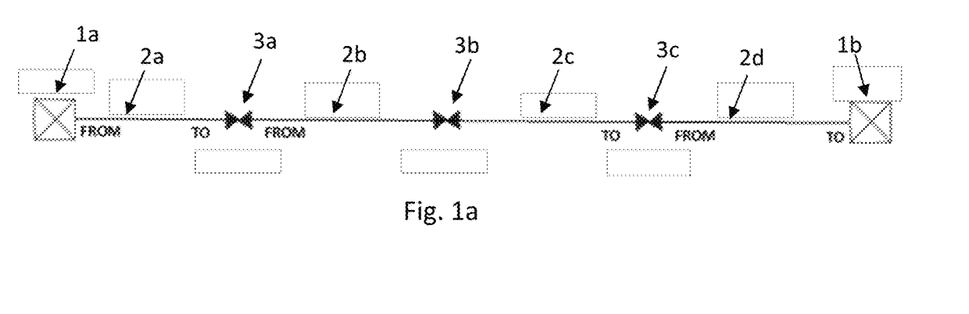
FIG. 1a is a schematic of a signal path.

Each signal can be unique and can be defined by a single record in the Signal Table (see FIG. 1). An example of a signal path is shown in FIG. 1a. Here there is a first hut 1a and a second hut 1b. The huts are connected using four cables 2a, 2b, 2c, and 2d spliced together with splices 3a, 3b and 3c.

Figure 2:
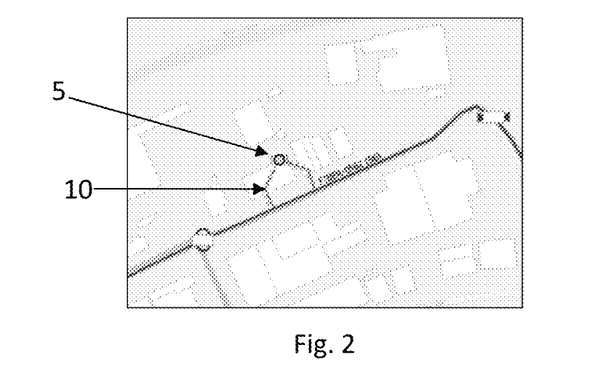
FIG. 2 is an image of a Map Location of the Building and Equipment.
Figure 3:
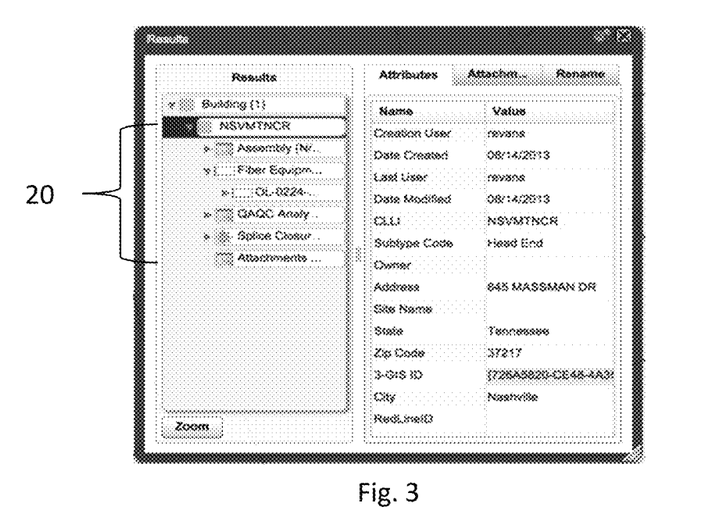
FIG. 3 is an image of a page showing the equipment within a building.

In FIG. 2 a building location 5 including a fiber cable 10 entering the building 5 is shown. Other relevant features are also shown (e.g. building footprints, fiber cables, splice closures). Within each building 5 a collection of equipment can be maintained. The image of FIG. 3 shows equipment 20 including assembly, fiber equipment, splices, and attachments. Each equipment within the building contains a collection of ports.

Figure 4:
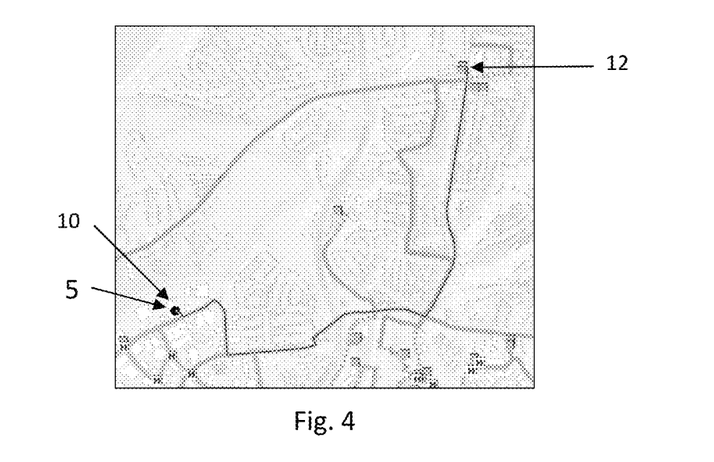
FIG. 4 is an image of a wider mapped portion of the signal path of FIG. 2.

A signal path database record can be maintained as a collection of fiber strands and equipment ports are connected. This database record manages the grouping of components (e.g. building, fiber cables, splice closures) that make up the overall signal path. As shown in FIG. 4, this path can be displayed on a map (in this example, showing a panned out area from the map of FIG. 2). Here the signal path is illustrated between the building source 10 to the path end at location 12. As shown, the signal path traverses multiple fibers and many different splice closures or equipment features.

Signals can terminate at a port, on an equipment, at each end of the signal path. Some signals can terminate at the source equipment. In some instances, signals may not terminate at all. The source of the signal can be referred to as the A side of the Signal. This A side representation can be defined in the Signal Table (see FIG. 1) in the AStructureName, AStructureId, AStructureIpid, AEquipmentId, AEquipmentName, APortId, APortName, and APortType attributes. The ending side of the signal can be referred to as the Z side of the Signal. This Z side representation can be defined in the Signal Table the ZStructureName, ZStructureId, ZStructureIpid, ZEquipmentId, ZEquipmentName, ZPortId, ZPortName, and ZPortType attributes. Signals can traverse multiple fibers through many different fiber splice or equipment features. As shown in the signal record of FIG. 1, the primary key on the Signal Table can be the IPID attribute 30. Each geospatial feature and table record relating to the signal can have a reference to the signal IPID attribute, normally stored in a SignalIPID attribute 30'.

Referring to the example of FIG. 1a, an entire signal path is represented. The signal record of FIG. 1 provides information regarding the structure, the equipment used, and the port from which a signal originates as well as the structure, the equipment used, and the port to which a signal terminates. In this example the path contains the source structure (Hut1) as well as the ending structure (Hut2). Each of these structures has related equipment features. Each of the equipment features has related port records. In this example (FIG. 1a), the signal path also contains four fiber cables, each with related fiber records. Three splices are also represented on this signal path as well as fiber splice records (aka connection records), related to those splices. The Signal record for FIG. 1a is shown in FIG. 5 and shows all related records for the signal path of FIG. 1a.

Figure 5:
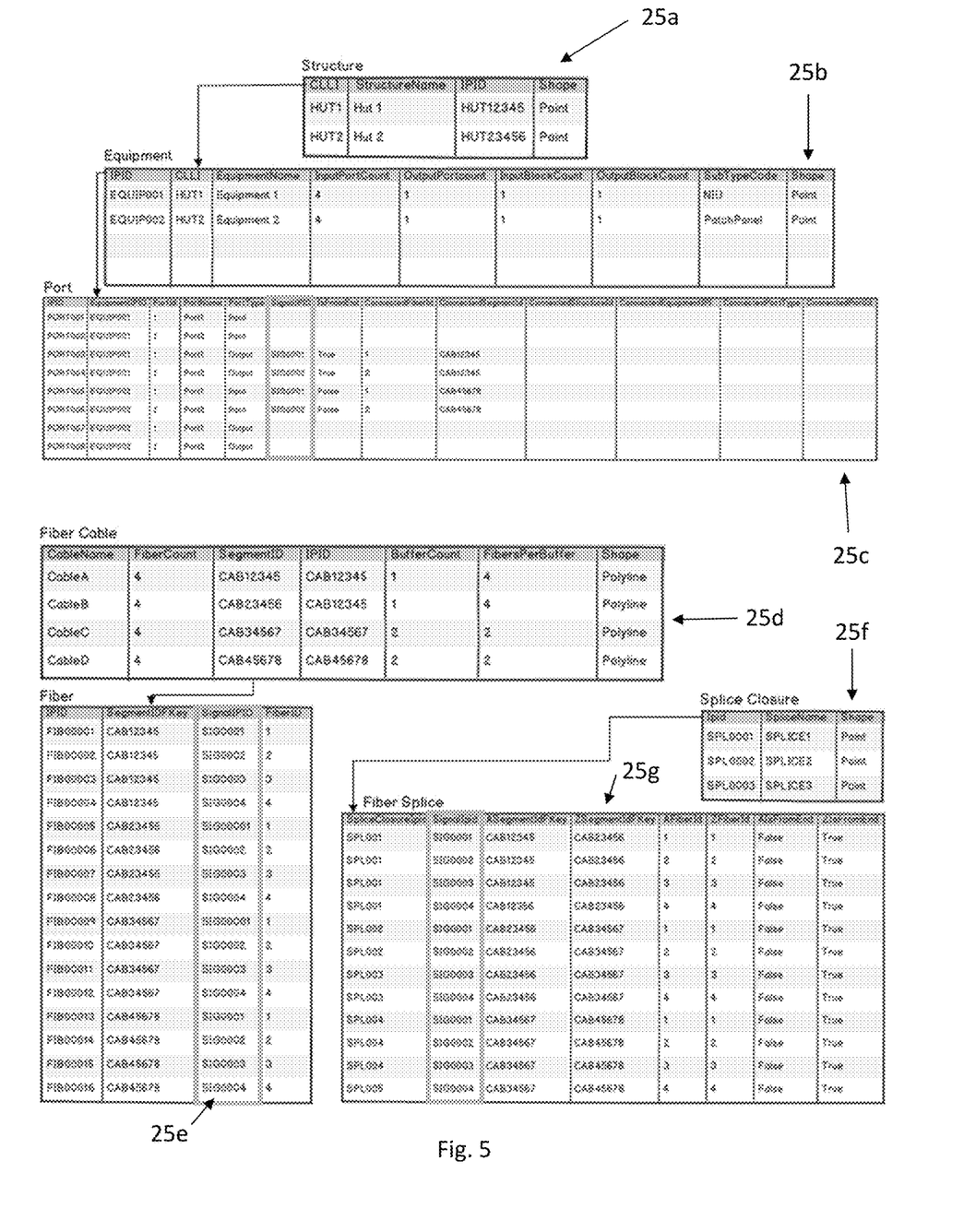

As shown in FIG. 5, the equipment of HUT1 is of subtype NIU (network interface unit) and the Equipment of HUT2 is a patch panel. As shown in the Port table 25c of FIG. 5, two signals SIG0001 and SIG0002 are output from two ports of the NIU of HUT 1 and received by PORT005 and PORT006 of the Patch Panel (EQUIP002) of HUT2.

Also shown in FIG. 5 are the Fiber Cable table 25d, the Fiber table 25e, the Splice Closure table 25f, and the Fiber Splice table 25g. Each fiber within each fiber cable is tabulated as shown and includes the fiber carrying each signal. At each splice each signal and segment is also tabulated in the combined Splice Closure table 25f and the Fiber Splice table 25g.

Structures

Structures can be buildings, manholes or poles. However, other features can be configured as Structures as well. As shown, each structure has a configured Structure Id, which is a unique value that will relate the Structure to its equipment. As shown, the Structure ID is stored on the Structure table 25a of FIG. 5 and can be configured to be any attribute on the Structure. Multiple structure features can be defined, each having a different configured Structure ID. Structure configuration can be done through the Admin Structure Settings page shown in FIG. 6. Each structure can also have a Structure Name, which is also configurable through the Admin Structure Settings page. It is recommended that Structure names are unique, but this is not a requirement.

Equipment

Figure 7:
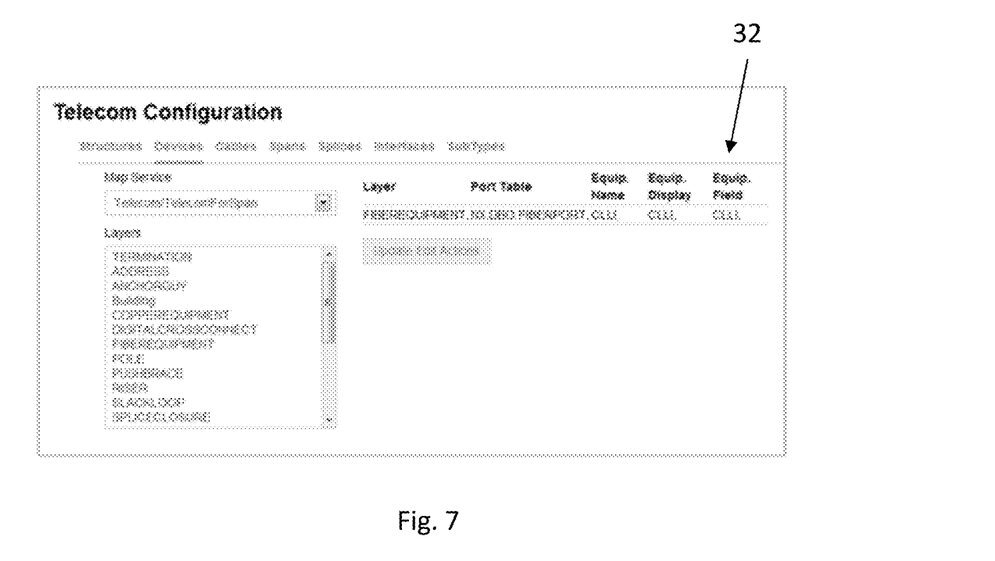
FIG. 7 is an image of the admin equipment settings page.

An equipment, also known as a device, is a feature that contains ports to which fiber can be connected. Every device is generally contained within a Structure. The relationship between Structures and Equipment is configurable in the Admin Equipment Settings page as shown in FIG. 7.

Figure 6:
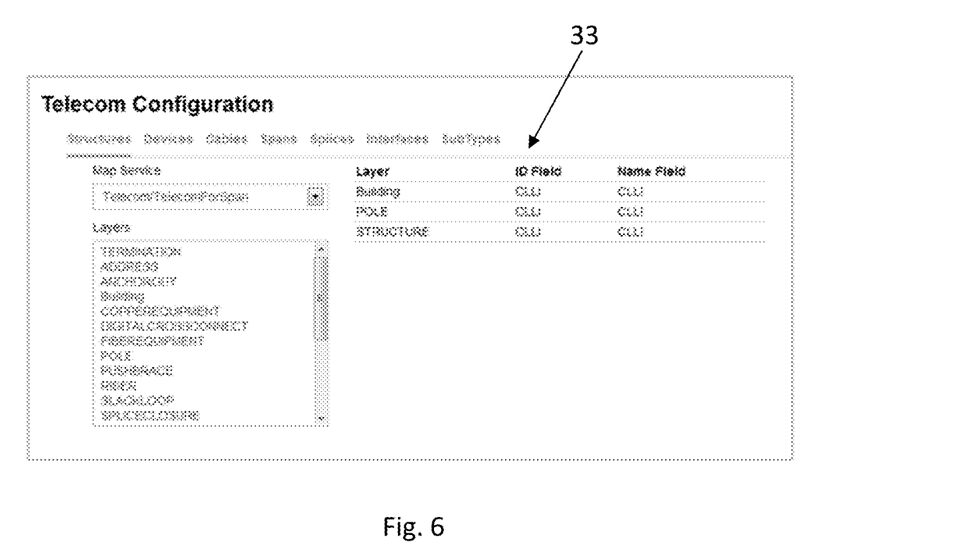
FIG. 6 is an image of the admin structure settings page.

The attribute in the Equipment Field column 32 will be the foreign key that relates to the Structure Id field configured on the Admin Structure Settings page of FIG. 6. As shown, the values in both of these fields match so that the web application associates the Equipment with the Structure. The Equipment table 25b contains information about the port count in the following attributes: InputPortCount, OutputPortCount, InputBlockCount, OutputBlockCount. Ports on the equipment are contained in blocks. These attributes can define how many ports are contained in each block on the equipment.

Figure 8:
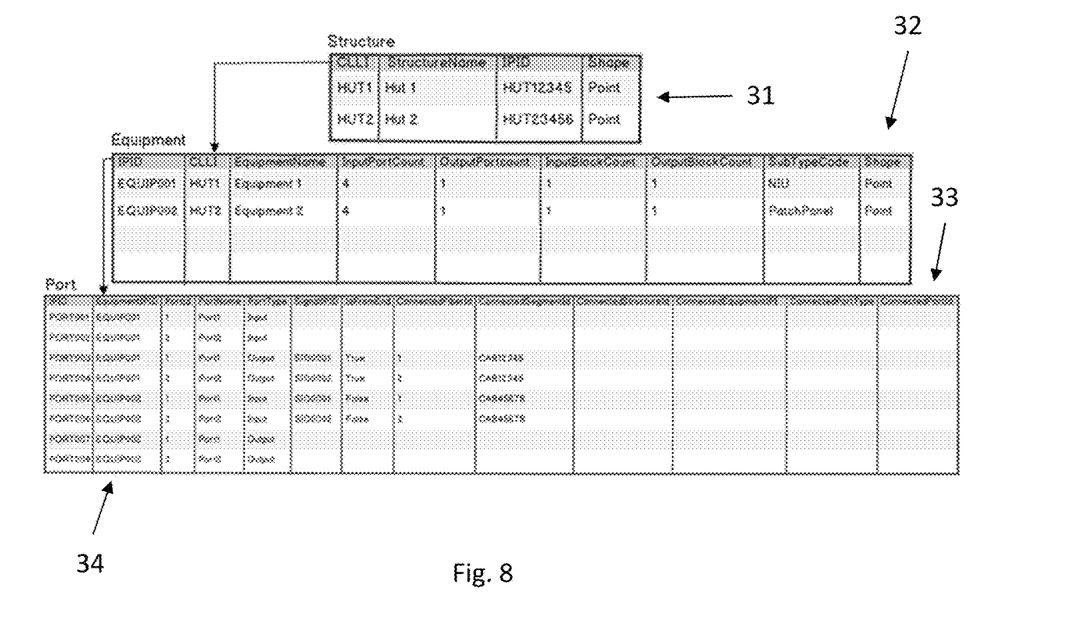
FIG. 8 is an image of structure, equipment, port tables.

Port data can be stored in a standalone table as shown in Port table 33 of FIG. 8 and can be related through database relationships to the Equipment feature class by an Equipment ID as shown in Equipment table 32 and Port table 33 in column 34. Each port can contain PortId, PortType and PortName and SignalIPID. The Port Id can be a number that can identify its physical slot number on the device. The port type can define whether the port is an input or output port and PortName is an identifier for the port. The SignalIPID can be the foreign key to the related signal record in the Signal Table as shown in FIG. 1 and FIG. 8. As shown in the Port table 33 of FIG. 8, the SignalIPID will only be present when the port is connected. When a port is connected to a fiber or another port, the following attributes can be populated: IsFromEnd, ConnectedfiberId, ConnectedSegmentId, ConnectedStructureId, ConnectedEquipmentIPID, ConnectedPortType, ConnectedPortId.

Figure 9:
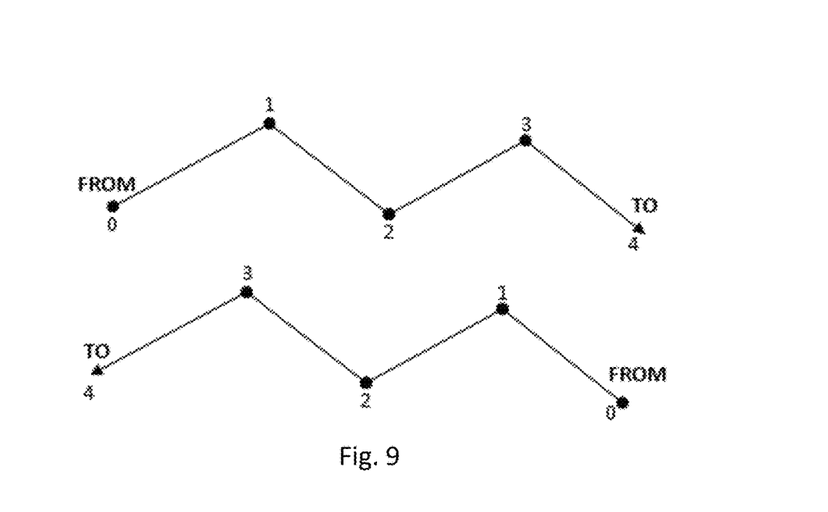
FIG. 9 is a schematic of polylines with vertices.
Figure 10:
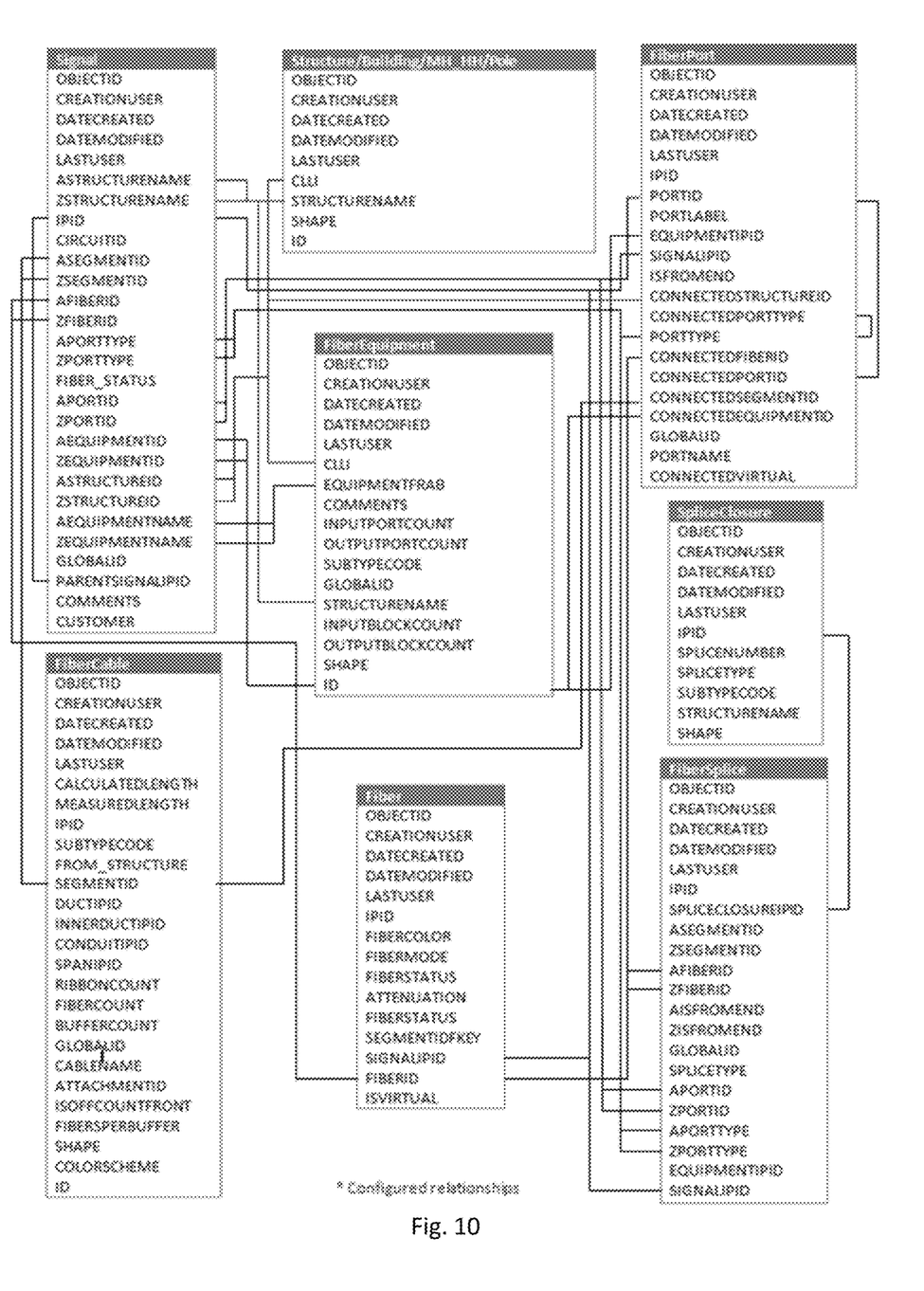
FIG. 10 is an entity diagram.

Though other cables types can be used, in this illustration fiber cables are linear polyline features that contain fibers. Fiber Cables can have the following attributes: FiberCount, BufferCount, FibersPerBuffer, IsOddCountFront. Fiber Count determines how many related fibers the cable will have. Fibers can be contained within buffer tubes inside the cable. Buffer Count determines how many buffer tubes exist inside the cable and Fibers per buffer determine how many fibers each buffer tube contains. In some instances, there will be an odd count of fibers, which can mean that all buffer tubes will not have the same number of fibers in them. In those instances, the buffer tube containing the odd number of fibers will either be the first or last buffer tube. This is determined by the value in IsOddCountFront in FIG. 10. Each Fiber Cable has a FROM end and a TO end. Since a Fiber Cable is a linear feature, its shape is a polyline. Polylines are stored as an array of Paths. Each path is an array of points. The first point in a path can be referred to as the FROM point. The last point in a path is the TO point. Each point in the path can be called a vertex (see FIG. 9).

Figure 11:
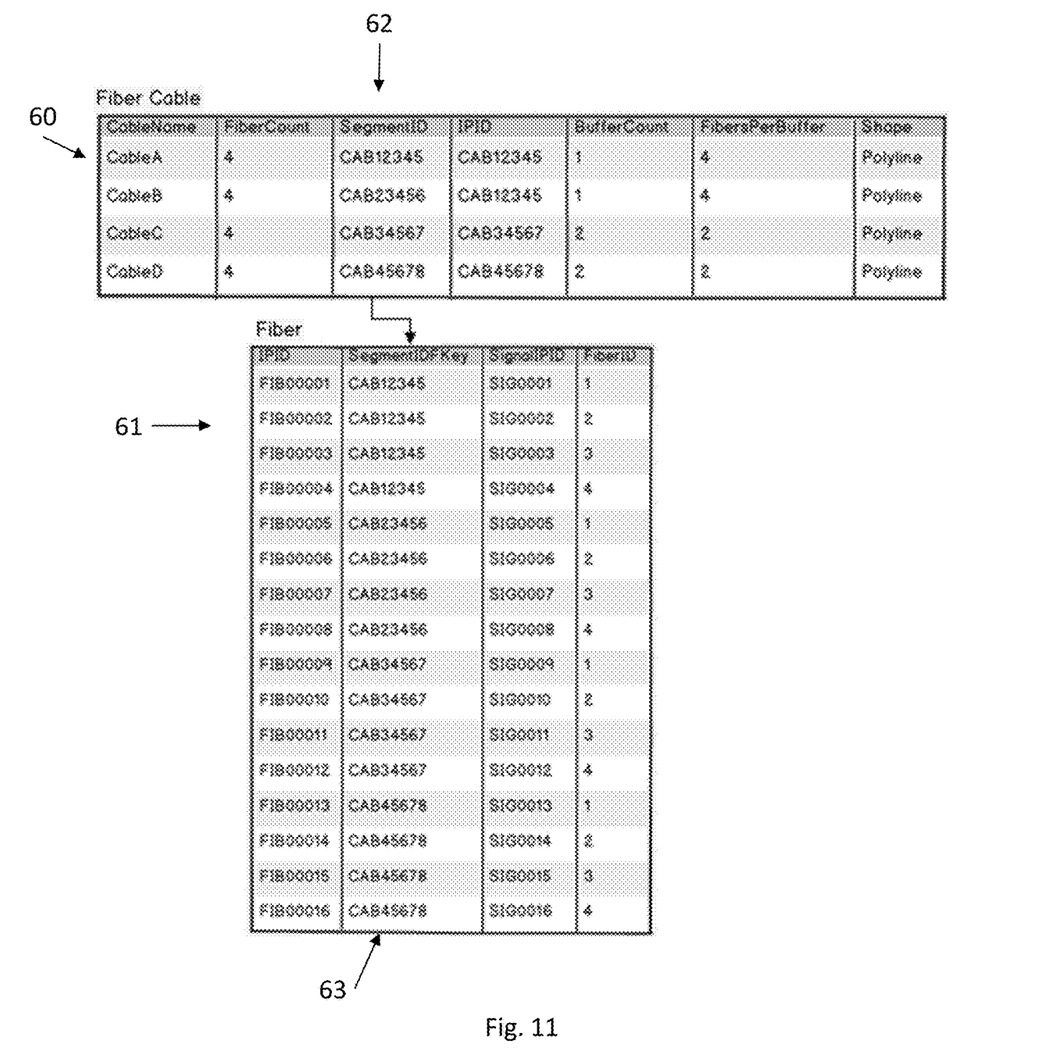
FIG. 11 is an image of table records for fiber cable and fiber.

Fiber data can be stored in a standalone table and related through database relationships to the Fiber Cable feature class by Segment Id (see FIG. 11). Each fiber can contain a FiberId, which is the physical fiber number within the Fiber Cable. Each fiber can also contain a SignalIPID, which is the foreign key to the related signal record in the Signal Table (see FIG. 1 and FIG. 11). Until multiple fibers are connected together, creating a signal path, each fiber is assigned a unique SignalIPID 30 as shown in the first two signals of the signal record of FIG. 1 and a blank signal record is created without any terminating ends as shown in the last two signals, meaning none of the attributes on the signal record are populated except IPID 30'. In this embodiment, each fiber inside the fiber cable represents an entire signal, which starts at one end of the cable and ends at the other end of the cable. Multiple fibers can be related to the same signal record if they belong to the same signal path. The Fiber Cable table 60 and the Fiber table 61 of FIG. 11 shows a relationship between the Fiber cable and fiber and how the SegmentID column 62 identifies with the SegmentIDFKey column 63.

Figure 12:
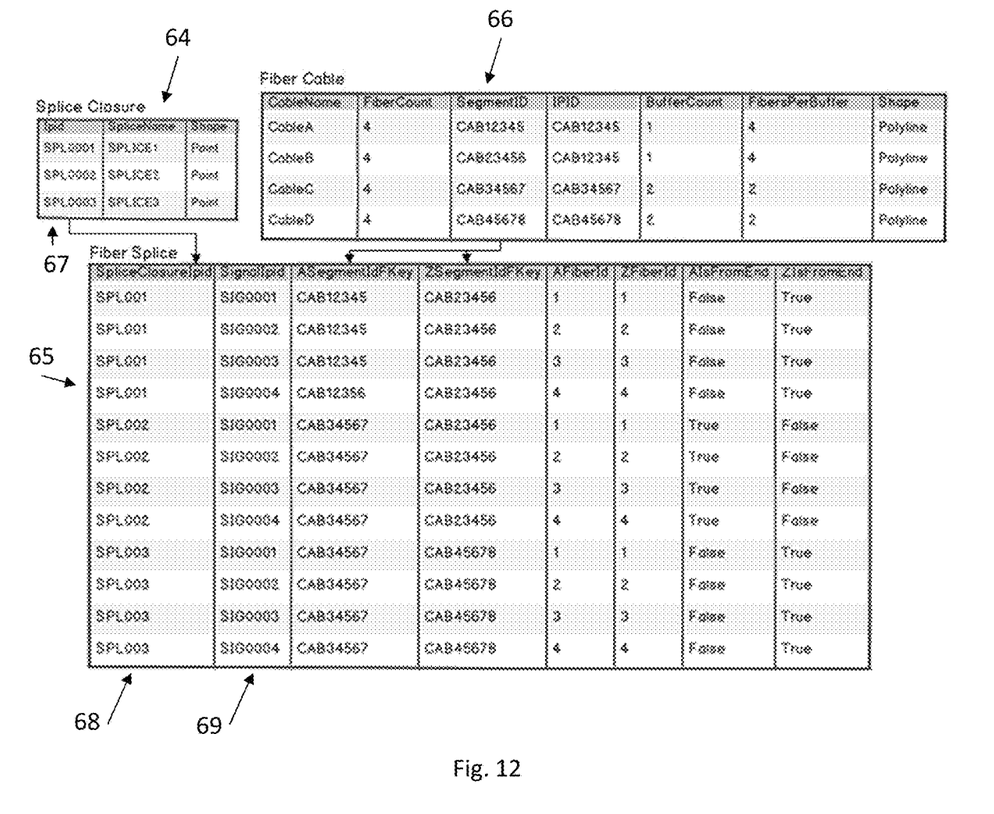
FIG. 12 is an image of table records for splice closure, fiber cable, and fiber splice.

The Fiber Splice table 65 of FIG. 12 is a standalone table record that represents two fibers connected together at a splice closure feature. Each splice record can have the following attributes: SpliceClosureIPID, ASegmentId, AFiberId, AIsFromEnd, ZSegmentId, ZFiberId, ZIsFromEnd and SignalIPID. The Splice Closure IPID 67 is the foreign key to the Splice Closure feature 68 the splice is related to (see FIG. 12). Each splice connection has an A side and a Z side. The ASegmentId, AFiberId and AIsFromEnd relate to the fiber cable and related fiber record that are connected on the A side of the splice (see FIG. 12). The ZSegmentId, ZFiberId and ZIsFromEnd relate to the fiber cable and related fiber record that are connected on the Z side of the splice (see FIG. 12).

The IsFromEnd on each side of the splice determine which end of the cable that the fiber is connected. Each fiber splice is related to a signal record via the SignalIPID foreign key 69 of FIG. 12.

Figure 12A:
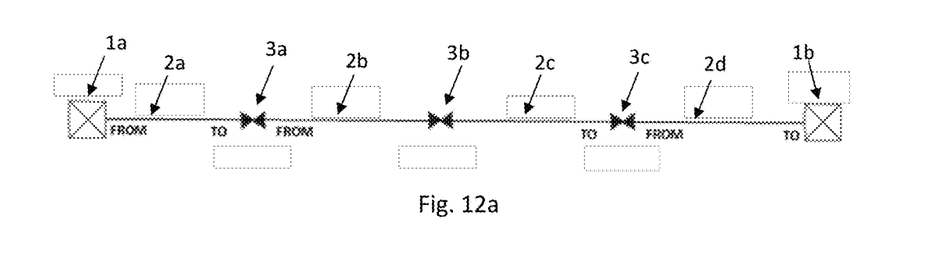
FIG. 12a is a schematic of a signal path.

In FIG. 12a, three fiber splices are represented. CableA, CableB, CableC and CableD (Cables 2a, 2b, 2c, and 2d as shown in FIG. 12a, respectively) are all four count cables, which means they have four related fiber records. The data in FIG. 12 shows the fiber splice records for each of the splice closures represented in FIG. 12a. All four fibers in cable 2a are spliced (a.k.a. connected) on the TO end of cable 2a to all four fibers in cable 2b on the FROM end of cable 2b. Cable 2a represents the A side of the splice while cable 2b represents the B side of the splice. All four fibers of cable 2b are then spliced with the TO end of cable 2b to all four fibers of cable 2c on the FROM end of cable 2c.

Notice that these splice records indicate that cable 2c is the A side of the splice while cable 2b is the Z side of the splice. The A and Z side of the splice are determined by how the splice is connected in the Connection Manager as taught below in how connections are created and recorded in signal management. It should be noted that it is not critical which cable represents the A and Z side of the splice. This is just a mechanism for storing each side of a splice connection.

Signal Management can maintain proper relationships between feature classes and standalone tables that allows one to render, edit, and manage a geographical representation of a complete signal path, including all physical cabling and support infrastructure.

A "connection" is a term that refers to a relationship between two features and their related records. As shown here, three types of connections are generally made in the application: I) Fiber to Fiber connections are when 2 fibers are connected to one another. II) Fiber to Port connections are when a fiber is connected to a port on an equipment. Finally, III) two ports on different equipment, or the same equipment, can be connected together as a Port to Port connection.

When two features are connected they become related to a single unique signal via a Signal IPID foreign key. The relationship to the signal is maintained differently in each scenario. All connections are "created" through the Connection Manager as illustrated and displayed in FIG. 13.

I) A single fiber can be connected to another single fiber. Before this connection is made, both fibers have their own separate related signal records (see FIG. 1). When a fiber to fiber connection is made through the Connection Manager (see FIG. 13), a fiber splice record is created similar to that of FIG. 12. This record has the splice closure IPID that relates to selected splice in the Connection Manager (see FIG. 13). The ASegmentId, AFiberId, AIsFromEnd, ZSegmentId, ZFiberId, ZIsFromEnd is also populated based on the selected A cable (dropdown box 70 on the left with Fibercable: 339821) and selected B cable (drop down box 71 on the right) in the Connection Manager (see FIG. 13). The related signals of the two fibers being connected are merged together and the SignalIpid is populated with the IPID from the related Signal record 30 of FIG. 1. See also FIG. 12.

II) A single fiber can be connected to a single port on an equipment. This fiber to port connection becomes the terminating end of a signal. When a fiber to port connection is made, the following attributes are updated: ConnectedFiberId, ConnectedSegmentId, IsFromEnd (See page 5 of code/pseudocode under heading Createfiberportconnection). This information indicates which fiber is connected to the port, which cable that fiber is related to, and which end of the cable the port is connected on. The Signal IPID is updated to the signal that the connected fiber is related to.

Figure 13:
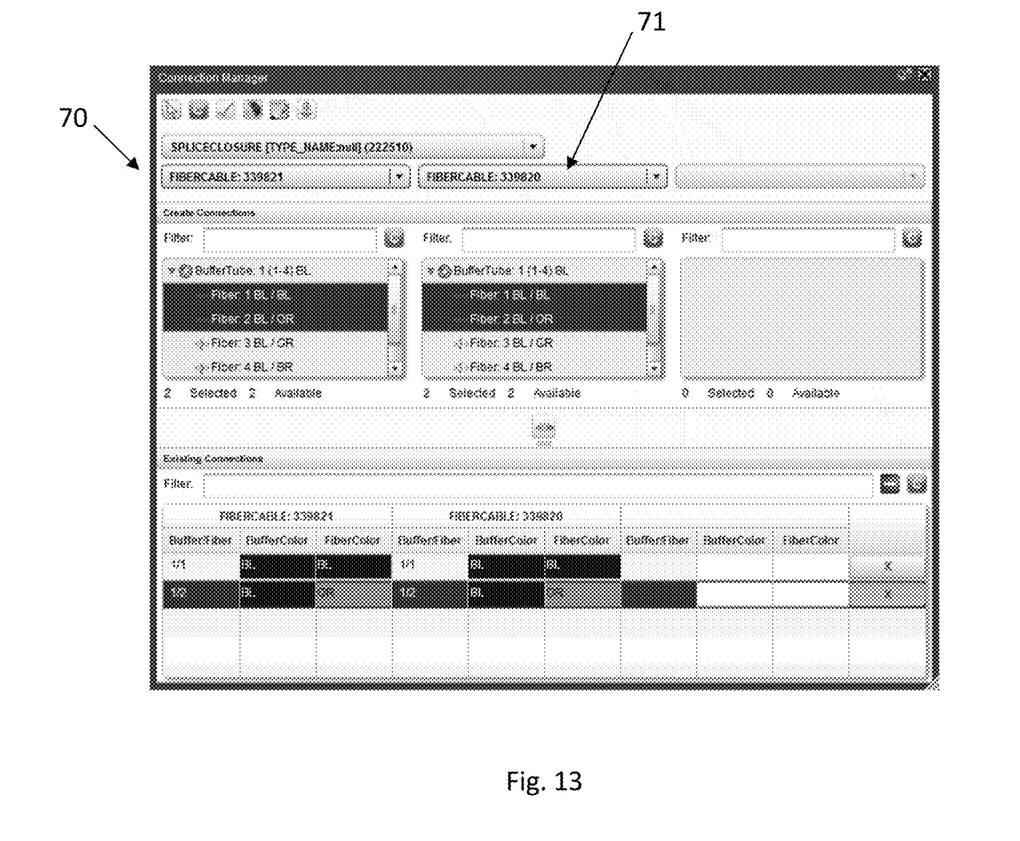
FIG. 13 is an image of the connection manager.

III) Two ports, each on a different device, can be connected together using the Connection Manager shown in FIG. 13. When this port to port connection is made, a virtual fiber record is created with a unique SegmentIdFKey attribute and the IsVirtual attribute set to True. Each port is then connected to this virtual fiber using the Fiber to Port connection logic (see Fiber to Port Connection).

Patch Panel is a special type of equipment that allows the signal to pass through the equipment, rather than terminate at the equipment. Patch Panels have Input and Output ports. When the same fiber number for the input port and output port are connected to a fiber (see Fiber to Port Connections), a jumper is created that allows the signal to pass through the equipment. This jumper is a new fiber splice record that is added. The ASegmentId, AFiberId, and AIsFromEnd on the new fiber splice record relates to the fiber that is connected to the Input port. The ZSegmentId, ZFiberId and ZIsFromEnd on the new fiber splice record relates to the fiber that is connected to the Output port. In addition to the fiber connection information, additional attributes are populated that relate to the Patch Panel itself. The following attributes are populated on the new fiber splice record: EquipmentIpid, APortId, APortType, ZPortId, ZPortType. The EquipmentIpid is the IPID value of the Patch Panel feature. APortId and APortType relate to the Input port number and port type that is connected to the A side fiber. The ZPortId and ZPortType relate to the Output port number and port type that is connected to the Z side fiber. Once this fiber splice record has been created, the Patch Panel is treated like a Fiber to Fiber Connection (see Fiber to Fiber Connections) and the two signals relating to the fibers connected to the Input and Output ports are then merged.

Splitters are a type of multiplexer devices that allow one signal to come in on the Input side of the device, and multiple signals go out on the Output side of the device. Each signal connected to the Output ports on the splitter will be individual, unique signals. The splitter will be a terminating end on each of those signals. The signal connected on the Input side of the splitter will also be an individual, unique signal. The splitter will also be a terminating end on this signal as well. The signal on the Input side will be the "Parent" signal. Splitters generally will have only one Input port, therefore in such instances each Splitter will only have one parent signal. They may have multiple Output ports. The signals on the output side are "Child" signals. In some embodiments, the Input port of the splitter is connected to a fiber. In such embodiments, the signal related to the Input port connection becomes the parent signal. When an Output port on the splitter is connected to a fiber, as shown here, that signal will have its ParentSignalIpid attribute populated with the IPID from the parent signal. This Parent/Child signal relationship allows for tracing signals through the splitter, even though each signal on the Input and Output side of the splitter can actually terminates at the splitter.

Cross Connects are similar to Patch Panels, however, Cross Connects do not have to be connected to the same port number for both Input and Output port types. In order for two ports on a cross connect to be connected to one another and allow the signal to pass through, each port generally should be connected to a fiber. Once the two ports are connected, a jumper can be created in the same way as it is done with Patch Panels.

When two signals are merged, they can become a single signal record. However, each signal can have unique attribution. When merging the two signals, attributes from the dominant-side signal can be kept on the final signal record. In some embodiments, the dominant-side signal can be determined in different ways by examining the terminating ends of each signal. If only one of the signals has a terminating end (e.g. source equipment), that can become the dominant signal. If neither signal has a terminating end, the signal with the greater number of related splices (see FIG. 4) can become the dominant signal. When the final signal is determined and attributes have been copied over, all related features and table records can have their SignalIpids updated to the IPID on the merged signal (see FIG. 1 for all relationships to Signal IPID).

Figure 14:
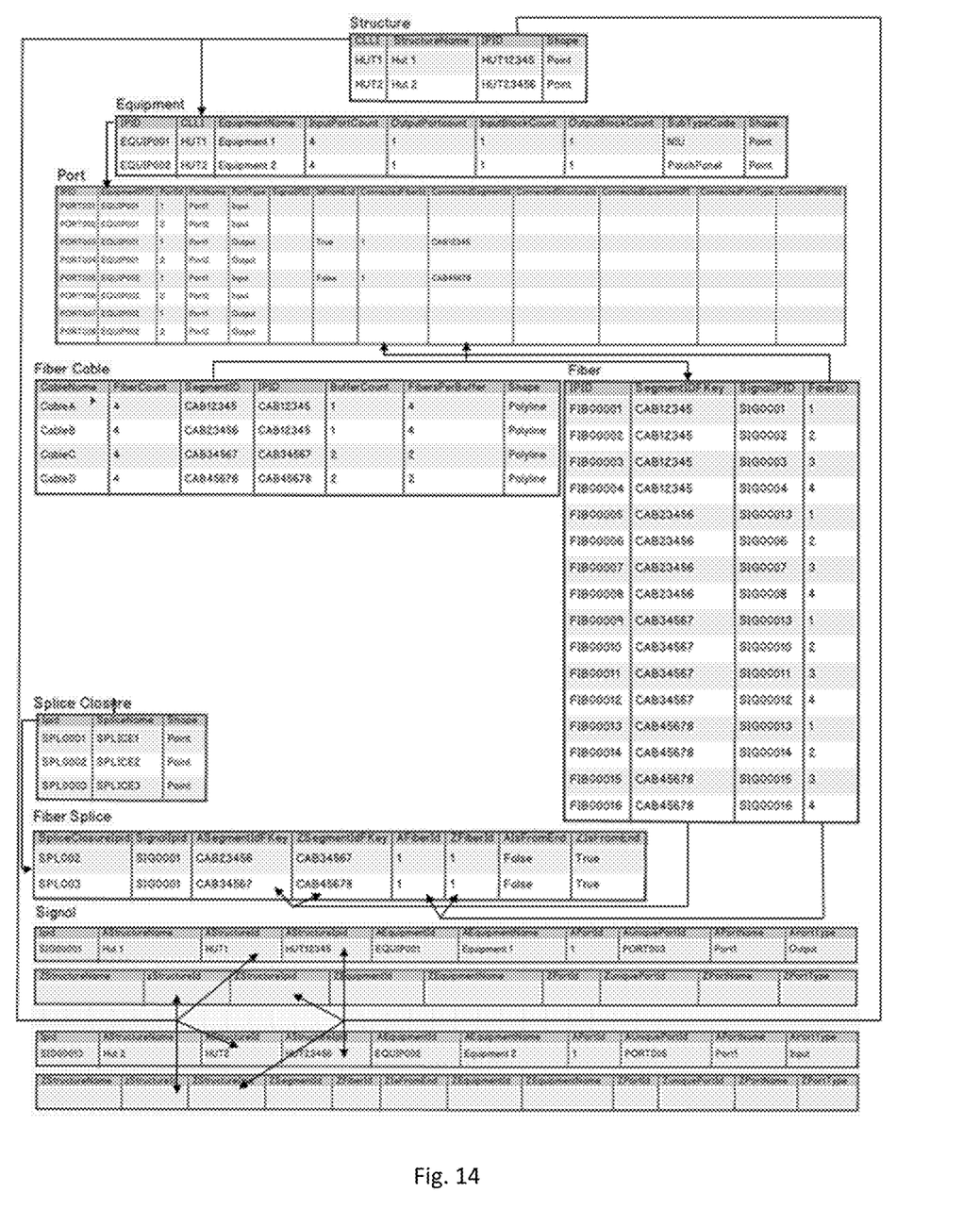
FIG. 14 is a snapshot of the data and relationships before a new connection is made.
Figure 14A:
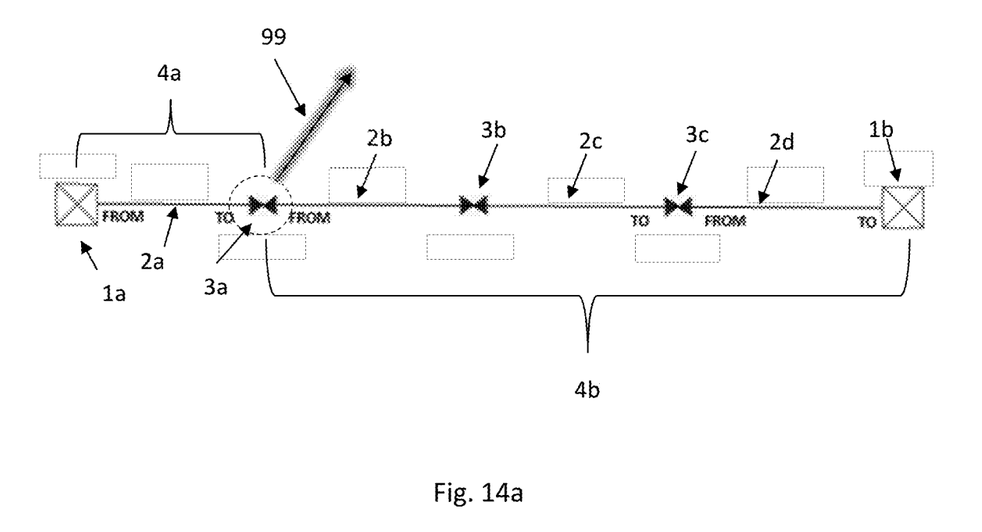
FIG. 14a is a schematic of a signal path.

In FIG. 14a, two separate signals, 4a and 4b, are shown: "Signal 1 (SIG00001)" identified by 4a and "Signal 13 (SIG00013)" identified by 4b. Signal 4a terminates at HUT1 (having identifier 1a) and runs down Fiber 1 of CableA (having identifier 2a). Signal 2 terminates at HUT2 (having identifier 1b) and runs down Fiber 1 of CableD (having identifier 2d), through Splice3 (having identifier 3c) to Fiber 1 of CableC (having identifier 2c), and then through Splice2 (having identifier 3b) to Fiber 1 of CableB (having identifier 2b). FIG. 14 shows a snapshot of the data and relationships before the New Connection 99 is created and the two signals are merged.

Figure 15:
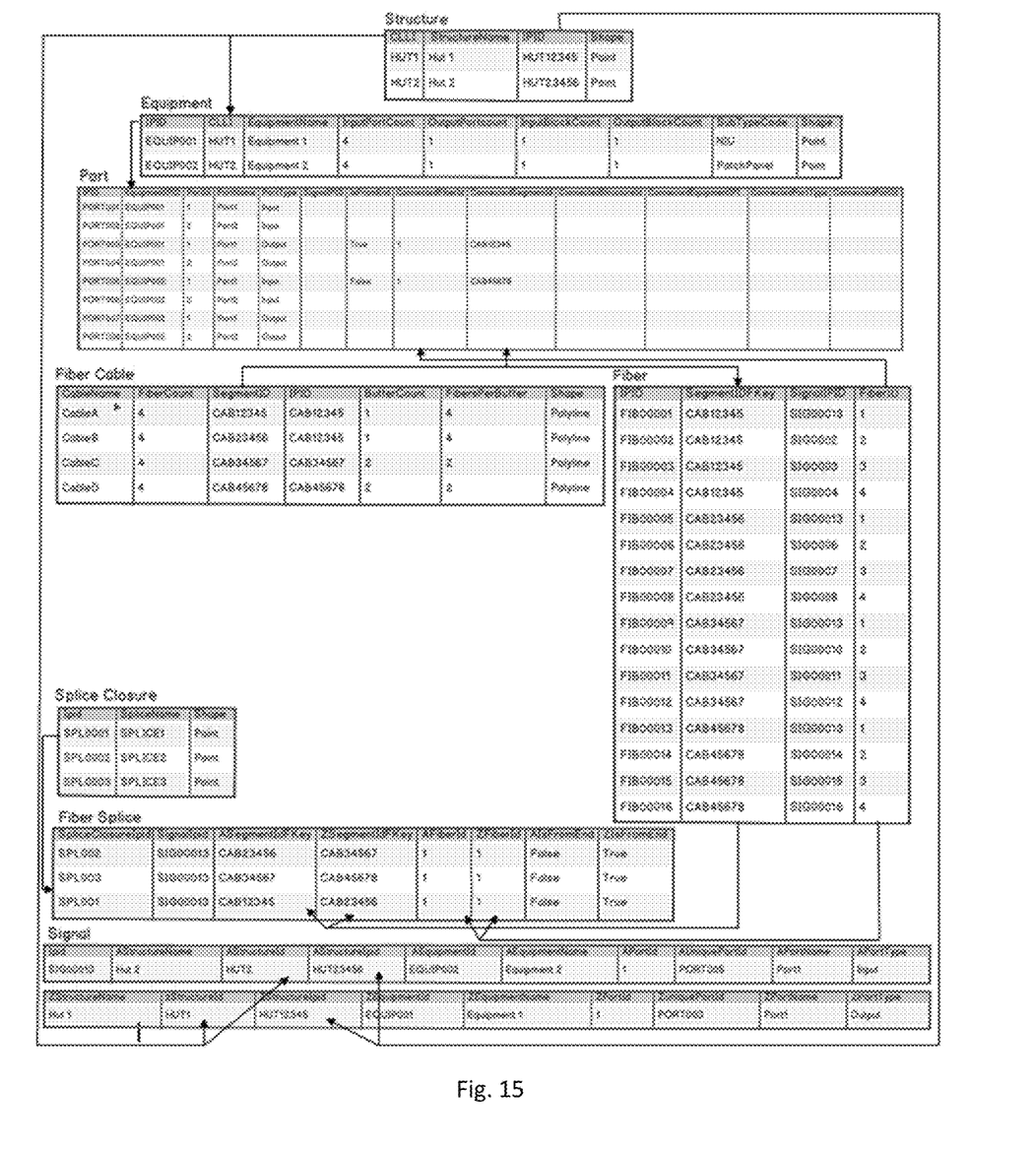
FIG. 15 is a snapshot of the data and relationships after a new connection is made.
Figure 16:
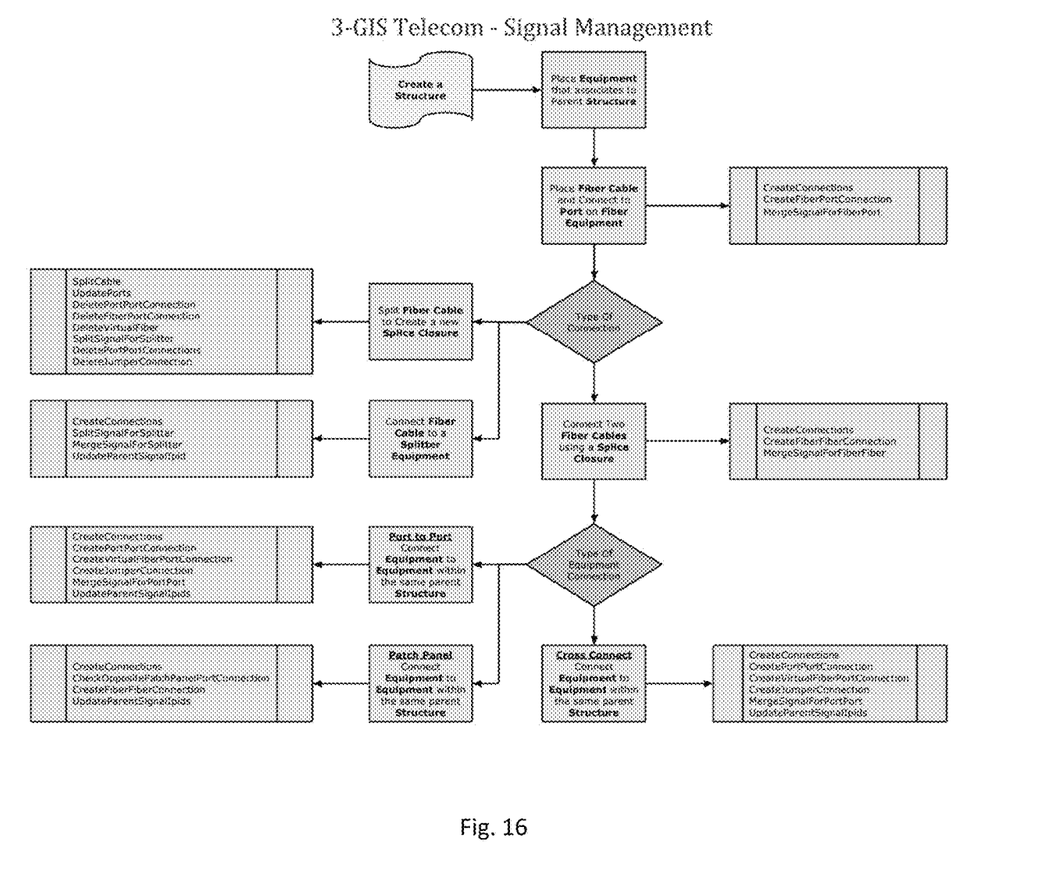
FIG. 16 is a flowchart of the overall system.

FIG. 15, below, shows a snapshot of the data and relationships after the New Connection is created and Signal 1 and Signal 13 have been merged. Signal 13 became the dominant signal because both Signal 1 and Signal 13 had terminating ends and Signal 13 had more related splice records than Signal 1. All related tables (e.g. Port, Fiber, Fiber Splice, Signal) were updated with the Signal 13 Signal IPID (SIG00013).

In some embodiments, when a single signal is split, that signal becomes two separate signal records. Normally, signals are split at a fiber splice. In that case, the fiber splice record is deleted. All related fiber splices can then be geometrically ordered starting from the A side of the signal to the Z side of the signal. The splices can then be split into two groups. The first group of fiber splices can occur spatially before the split point, and the second group of fiber splices can occur spatially after the split point. A new signal can then be created. All attributes from the original signal can be copied over to the new signal. The terminating ends of the original signal can then be examined. If neither end of the original signal has a terminating end, one of the groups of splices can have their Signal IPIDs update to the IPID on the new signal and the split is complete. If the original signal has either, or both, an A or Z terminating end, the two groups of splices can be examined to see which terminating equipment belongs to which group. When this is determined, the terminating equipment information (i.e. AStructureId, AStructureName, AEquipmentId, AEquipmentName, APortId, APortId, APortType) can be updated on both signals. The correct group of fiber splices can have their Signal IPIDs updated to the IPID on the new signal and the split will be complete.

Split can be viewed as opposite of merge. In FIG. 1a the data snapshot before the split would look like FIG. 15. If the New Connection that was created during the merge was then deleted during the split, the data snapshot after the split would look like FIG. 14.

Please find attached code and pseudocode attached as Exhibit 1.

For the purposes of this disclosure, like reference numerals in the figures shall refer to like features unless otherwise indicated.

The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method of maintaining functioning relationships between geospatial features and standalone tables for rendering, editing, and managing a geospatial representation of a complete signal path, the method comprising:
   transmitting a signal through an optical network creating unique attributes as the signal traverse through the optical network;
   receiving the traversed signal, and based on the created unique attributes of the received signal:
   creating a structure,
   placing equipment that associates to the structure,
   placing cable and connect to port on fiber equipment,
   determining type of connection,
   determining type of equipment connection,
   creating an editable record of the signals that are unique and defined by a single record in a signal table for each of the connections to equipments;
   creating a geospatial representation of a complete signal path between equipments; and,
   displaying the editable record and the geospatial representation of a complete signal path between equipments on a manipulatable geospatial computing device.

2. The method of claim 1 including
Creating a map of the features of the record associated with the signal path.

3. The method of claim 1, wherein the geospatial features of a signal path can be displayed as multiple standalone tables in a single screen shot.

4. The method of claim 1 wherein the geospatial features of the signal path are displayed in one or more stand alone tables.

5. The method of claim 1 wherein the record is updated to indicate different signals from source to end, splicing of signals, and/or breaks in the signal path.

6. The method of claim 1 wherein the record of the signal path includes equipment and devices used.

7. The method of claim 1 wherein the record of the signal path includes fibers, cables, the signals on each fiber, and the fibers within a cable.

8. The method of claim 1, wherein building footprints and splice closures are included in the record.

9. The method of claim 1, wherein assembly, fiber equipment, splices, and attachments are equipments containing a collection of ports.

10. The method of claim 1, wherein the signal has a source portion and an end portion, the source portion of the signal and the end portion of the signal being defined in a signal table such that the geospatial features are identified distinctly between the source portion and the end portion.

11. The method of claim 1, wherein the signals are tracked on each fiber of the cable.

* * * * *